United States Patent
Schmidt et al.

(10) Patent No.: US 8,079,289 B2
(45) Date of Patent: Dec. 20, 2011

(54) COMPACT DRIVE, SPIROID GEAR UNIT, AND METHOD FOR MANUFACTURING A DRIVE UNIT

(75) Inventors: Josef Schmidt, Graben-Neudorf (DE); Bernhard Köhler, Bruchsal (DE); Thomas Leichter, Karlsruhe (DE); Jochen Mahlein, Karlsruhe (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 0 days.

(21) Appl. No.: 12/938,230

(22) Filed: Nov. 2, 2010

(65) Prior Publication Data

US 2011/0041637 A1    Feb. 24, 2011

Related U.S. Application Data

(63) Continuation of application No. 10/577,588, filed as application No. PCT/EP2004/012800 on Nov. 11, 2004, now Pat. No. 7,846,054.

(30) Foreign Application Priority Data

Nov. 13, 2003 (DE) .................................. 103 53 226
Oct. 6, 2004 (WO) .................. PCT/EP2004/011150

(51) Int. Cl.
F16H 37/06    (2006.01)
(52) U.S. Cl. ..................................................... 74/665 F
(58) Field of Classification Search .................. 74/665 F
See application file for complete search history.

(56) References Cited

U.S. PATENT DOCUMENTS

| | | |
|---|---|---|
| 652,781 A | 7/1900 | Johnson |
| 3,720,863 A | 3/1973 | Ringland et al. |
| 4,454,459 A | 6/1984 | Huber |
| 4,652,781 A | 3/1987 | Andrei-Alexandru et al. |
| 4,669,578 A | 6/1987 | Fukamachi |
| 4,838,106 A | 6/1989 | Adams |
| 4,852,434 A | 8/1989 | Bald |
| 4,908,757 A | 3/1990 | Jensen et al. |
| 4,920,303 A | 4/1990 | Perdriat |

(Continued)

FOREIGN PATENT DOCUMENTS

DE    3642724    6/1988

(Continued)

OTHER PUBLICATIONS

International Preliminary Report on Patentability, issued in corresponding International Application No. PCT/EP2004/12800.

(Continued)

*Primary Examiner* — Edwin A Young
(74) *Attorney, Agent, or Firm* — Kenyon & Kenyon LLP (57) ABSTRACT

In compact drive, spiroid gear unit, and method for manufacturing a drive unit that includes at least an electric motor, a brake, a gear unit, and a frequency converter, the output shaft of the gear unit and the rotor shaft are positioned in parallel to each other, and the shaft-center distance is determined by at least one gear stage. The first gear stage includes a first toothed member connected to the rotor shaft, and a second toothed member, which engages with the first toothed member and is connected to an intermediate shaft, the brake, including at least a brake-rotor shaft, being integrated in the housing of the compact drive, the brake-rotor shaft being parallel to the rotor shaft, and the brake-rotor shaft being connected to a toothed member, which engages with the second toothed member.

1 Claim, 6 Drawing Sheets

U.S. PATENT DOCUMENTS

| | | | |
|---|---|---|---|
| 4,963,778 | A | 10/1990 | Jensen et al. |
| 5,202,596 | A | 4/1993 | Jensen et al. |
| 5,355,373 | A | 10/1994 | Salmon et al. |
| 5,372,213 | A | 12/1994 | Hasebe et al. |
| 5,501,117 | A | 3/1996 | Mensing et al. |
| 5,632,469 | A | 5/1997 | Heun et al. |
| 5,634,374 | A | 6/1997 | Depietri |
| 5,994,807 | A | 11/1999 | Coles et al. |
| 6,097,123 | A | 8/2000 | Weiss et al. |
| 6,164,407 | A | 12/2000 | Cheng |
| 6,169,345 | B1 | 1/2001 | Bloch et al. |
| 6,323,613 | B1 | 11/2001 | Hara et al. |
| 6,408,710 | B1 * | 6/2002 | Kullborg et al. ........... 74/490.03 |
| 6,453,863 | B1 | 9/2002 | Pels et al. |
| 6,577,034 | B1 | 6/2003 | Kitamura et al. |
| 6,766,708 | B2 | 7/2004 | Brooks |
| 6,925,694 | B2 | 8/2005 | Sauter et al. |
| 6,948,464 | B2 | 9/2005 | Ido et al. |
| 7,105,965 | B2 | 9/2006 | Mantovani |
| 7,191,678 | B2 | 3/2007 | Schunke et al. |
| 2007/0142139 | A1 | 6/2007 | Leichter et al. |

FOREIGN PATENT DOCUMENTS

| | | |
|---|---|---|
| DE | 4201373 | 8/1992 |
| DE | 4309559 | 9/1994 |
| DE | 19622396 | 12/1997 |
| DE | 69225149 | 8/1998 |
| DE | 19714784 | 10/1998 |
| DE | 19848324 | 4/2000 |
| DE | 19935196 | 12/2000 |
| DE | 19981897 | 3/2001 |
| DE | 20107326 | 6/2001 |
| DE | 10049883 | 4/2002 |
| DE | 20207519 | 8/2002 |
| DE | 10207760 | 9/2003 |
| DE | 10317749 | 1/2004 |
| DE | 10328228 | 12/2004 |
| EP | 0697759 | 2/1996 |
| EP | 0694203 | 4/1998 |
| EP | 1081827 | 9/1999 |
| EP | 0993098 | 4/2000 |
| EP | 1049234 | 11/2000 |
| EP | 1231701 | 8/2002 |
| EP | 1538730 | 6/2005 |
| GB | 2252137 | 7/1992 |
| JP | 60035937 | 2/1995 |
| JP | 2002-336305 | 11/2002 |
| WO | WO 85/04796 | 11/1985 |
| WO | WO 2004/100340 | 11/2004 |

OTHER PUBLICATIONS

Written Opinion of the International Searching Authority, issued in corresponding International Application No. PCT/EP2004/12800.

International Search Report, issued in corresponding International Application No. PCT/EP2004/12800.

* cited by examiner

COMPACT DRIVE, SPIROID GEAR UNIT, AND METHOD FOR MANUFACTURING A DRIVE UNIT

CROSS-REFERENCE TO RELATED APPLICATIONS

The present application is a continuation of U.S. patent application Ser. No. 10/577,588, filed May 15, 2006 now U.S. Pat. No. 7,846,054, which is a national phase of International Application Serial No. PCT/EP04/12800 filed on Nov. 11, 2004, claims priority to German Patent Application Serial No. DE 103 53 226.9 filed on Nov. 13, 2003, and claims priority to International Application Serial No. PCT/EP04/11150 filed on Oct. 6, 2004, each of which is expressly incorporated herein in its entirety by reference thereto.

FIELD OF THE INVENTION

The present invention relates to a compact drive, a spiroid gear unit, and a method for manufacturing a drive unit.

BACKGROUND INFORMATION

German Published Patent Application No. 197 14 784 describes a compact drive, which includes an electric motor, at whose one end face a gear unit is arranged, and at whose other end face a frequency converter is arranged. The electronics region and the motor region must be sealed with respect to the gear unit. In this context, it is disadvantageous that the axial length is large and that a power take-off can only be provided at one end face of the compact drive.

Japanese Published Patent Application No. 2002-336305 describes a gear motor, which does not include a frequency converter, however. Between the gear unit, motor, and brake, as well as between the corresponding housing parts, there are also interfaces that must be precisely manufactured and are therefore complex and expensive.

A frequency converter, which is axially mounted to an electric motor behind its blower and is therefore cooled by its air stream, is described in German Published Patent Application No. 196 22 396. However, this therefore requires a large amount of space and, in addition, a fan that must be able to direct ambient air past.

A piezoelectric brake is described in European Published Patent Application No. 0 694 203.

German Published Patent Application No. 102 07 760 describes an adjusting gear, which, however, requires a large amount of space and an interface to the rotor of the motor.

German Published Patent Application No. 198 48 324 describes a coupling, which, however, requires additional, complicated and expensive machining of the rotationally mounted parts. In particular, not only are the sun and the rotor shaft included, but also a coupling sleeve. A higher number of parts also means higher storage costs.

European Published Patent Application No. 1 081 827 describes an electric tool, in which a gear unit can be driven by an electric motor. However, an interface, which is difficult to manufacture, is provided between the housing parts of the motor and the gear unit.

An axially offset right-angle drive, i.e., a spiroid gear unit, which is connectable to an electric motor and can be driven by it, is described in German Published Patent Application No. 43 09 559.

SUMMARY

Example embodiments of the present invention may provide a compact drive which may eliminate the above-mentioned disadvantages. For example, axial length may be reduced and as many power take-off variants as possible may be implementable, e.g., one-sided and two-sided power take-off.

For a compact drive, features may include that the compact drive includes at least three drive components, such as an electric motor, a gear unit, and an electronic circuit, e.g., a frequency converter; a central housing part being provided, and each drive component being surrounded by the central housing part and at least one housing cover of the respective drive component to form a respective housing.

Each drive component may be at least connected to the same central housing part for purposes of heat dissipation, and that the heat may therefore be distributed by it. For example, the heat from a drive component, which is exhibiting a temperature peak at the time in question, may be introduced. Therefore, not only is each drive component's own housing utilizable for dissipating heat, but also the material region forming the housing for another component that is cooler at the same time. In the case of low motor currents and high speeds, heat flows, for example, from the drive unit to the motor; in the case of high motor currents and low speeds, the heat flows in the reverse direction. The heat should always travel through the central housing part and is distributed by it.

For the compact drive, features include that the compact drive includes at least three drive components, such as an electric motor, a gear unit, and an electronic circuit, e.g., a frequency converter; a central housing part being provided, the stator of the electric motor being detachably connected to the central housing part via, e.g., a clamping joint. It may be provided that the central housing part is initially machinable, using cutting and other machining steps; subsequently, the stator of the motor may then be inserted and locked. Therefore, no further machining step may subsequently be necessary. The motor may be detachable again and exchangeable for purposes of maintenance or service. In addition, a slip joint is not necessary, since simple detachment is not implementable.

For the compact drive, features include that it includes at least an electric motor, a brake, a gear unit, and a frequency converter, the output shaft of the gear unit and the rotor shaft being positioned in parallel to each other, the shaft-center distance from at least one gear stage being determined, the first gear stage including a first toothed member connected to the rotor shaft, and a second toothed member, which engages with the first toothed member and is connected to an intermediate shaft; the brake, including at least one brake-rotor shaft, being integrated in the housing of the compact drive, the brake-rotor shaft being parallel to the rotor shaft, and the brake-rotor shaft being connected to a toothed member, which engages with the second toothed member.

It may be provided that the overall axial length is reducible and one-sided and two-sided power take-off may be implemented. In addition, no axial length is necessary for the brake function, but rather the brake may be positioned in parallel next to the motor. The action of the brake via the toothed members further allows the nominal braking torque to be increased or decreased.

The electric motor may be a synchronous motor. It may be provided that high-speed positioning tasks may be executed by the compact drive and/or that a high torque is available over the entire speed range.

The frequency converter may be positioned laterally with respect to the rotor shaft. It may be provided that the overall length is reducible and the two sides of the output shaft are accessible, e.g., two-sided power take-off may be provided.

The gear region may be sealed with respect to the surroundings, and with respect to the motor region and the electronics compartment. It may be provided that the gear region may include lubricating oil, and that the electronics and the stator and rotor parts remain protected from the lubricant.

The gear region, the region of the motor, and the electronics compartment may be at approximately the same temperature. It may be provided that no thermal barriers are necessary, and that therefore, material may be dispensed with and mass and costs may be reduced.

The motor may include a sensor arranged at the one end of the rotor shaft. It may be provided that the compact drive may be used for positioning tasks, and that the sensor is protected by the housing of the compact drive. A brake, which may also be protected by the housing of the compact drive, is connectable to the other end of the rotor shaft.

The motor may not include a sensor, but the position may be ascertained with the aid of an estimation method. This may allow axial space to be saved.

The rotor shaft may remain completely in the interior of the housing, and therefore, no seals may be necessary from the rotor shaft to the surroundings. Consequently, a single shaft sealing ring arranged on the rotor shaft is sufficient. Since the rotor shaft may have a high speed, the amount of heat generated is therefore much less than in the case of a motor having two shaft sealing rings, e.g., on its two axial ends of the rotor shaft.

The output shaft may have three shaft sealing rings. However, since the speed is much less than in the case of the rotor shaft, the entire amount of heat generated is less than in the case of a design approach for the drive, where both the rotor shaft and the output shaft have two shaft sealing rings.

In an example embodiment of the gear unit, at least one spur-gear stage is used, which means that the overall axial length may decrease and a solution optimal with regard to costs may be produced.

The gear stage may be arranged as a variable transmission having a variable transmission ratio, which means that the wear of the gear stage may be minimized by the speed range, and the torque transmission may be adjusted to the loading case. In the case of the variable transmission, it may be provided that all of the seals for the engine compartment may even be dispensed with, since a variable transmission, e.g., a continuously variable wide-belt transmission, requires no lubricant or only insignificant amounts of lubricant. Therefore, only seals from the interior of the compact drive to the external environment may be necessary.

The rotor shaft and at least one shaft of the gear unit may be supported in the same housing part. It may be provided that the shafts may already be accurately aligned with each other during the manufacturing and machining of the housing part, for the housing part may be finished during only one instance of chucking, and the relative position of the bearing seats may therefore be aligned in a very accurate manner.

The braking resistor and lubricant are connected in a manner allowing effective heat conduction, so that the lubricant may be heated by the braking resistor.

The heat transfer resistance from the braking resistor to the lubricant may be less than that from the braking resistor to the environment. Therefore, when the ambient temperatures are low, the drive unit may be heated, in that the electronic circuit supplies sufficient power to the braking resistor. In this manner, the heat flows mainly from the braking resistor to the lubricant and therefore heats it sufficiently.

The heat transfer resistance from one of the stator windings to the gear lubricant agitated during operation may be less than that from the stator winding to the environment. Therefore, the heat from the stator winding may be rapidly carried off through the central housing part to the lubricant. The latter is agitated and therefore transports the absorbed quantity of heat to its housing. Consequently, the heat is rapidly distributed. Only the operation of the drive unit may be utilized for this purpose. Thus, an effect is that the central housing part, and also the housing cover of the gear unit, are brought to an approximately equal temperature, and therefore, the dissipation of heat to the environment may be optimized since the heat is distributed over as much of the surface of the housing as possible to the environment. In addition, the central housing part and the lubricant provide a large, common heat capacity, which aids in absorbing the temperature peaks.

In the event of a low rotational speed and, e.g., a large amount of power supplied to the motor, the resulting heat flows, on average, from the motor to the stator, and is then conducted through the housing to the environment.

In the event of high rotational speeds and, e.g., a small amount of power supplied to the motor, the resulting heat flows, on average, from the stator to the motor, and is then conducted through the housing to the environment.

Since a heat barrier is arranged between the central housing part and the housing cover, which contains the electronic circuit, i.e., the frequency-converter electronics, the heat from the power semiconductors of the frequency-converter output stage is carried off through this housing cover to the environment.

The braking resistor may be connected in a housing pocket of the central housing part in a thermally conductive manner, and electrically connectable in a detachable manner, via a plug-and-socket connector, to the housing cover containing the electronic circuit.

The compact drive may be arranged to be a rectangular parallelepiped having 6 sides, recesses being able to be provided. For example, only one to three sides are provided with housing covers for mounting and servicing the drive components. Therefore, the other sides of the housing of the rectangular parallelepiped may be formed by the central housing part. Thus, the dissipation of heat to the environment may be improved as well, since the central housing part distributes the heat of the heat sources, such as the braking resistor, brake, gear unit, and/or motor, etc.

To distribute the heat as mentioned above, it may be provided that each drive component is separated from every other one by only one housing wall of the central housing part. Therefore, the heat may need only to be passed through this one wall to another cooler component.

The electronic circuit is also connected to the one sensor, which allows a temperature applicable to the central housing part to be determined. In this manner, the electronic circuit allows the temperature of the drive unit to be monitored and, e.g., the flow of energy to be controlled. For the electronic circuit allows power to be supplied to the braking resistor and heat to be supplied, and it allows the motor to be operated with less power, i.e., the production of heat to be reduced. In the case of a providable brake coil of the brake, the supply of power for the purpose of dissipating heat is also controllable.

Features of the spiroid gear stage include that it is intended for a compact drive, a central housing part being provided, and each drive component being surrounded by the central housing part and at least one housing cover of the respective drive component to form a specific housing. Because of its cylindrical shape, the pinion of the spiroid gear stage may no longer need to be adjusted and calibrated after assembly. In addition, the available axial offset in the spiroid gear unit allows the drive unit to be designed to be highly compact. A spiroid gear stage and a spur-gear power takeoff stage allow not only a higher total efficiency to be attained, but also a reduction in the length in the axial direction of the motor, since the spiroid gear wheel may be positioned in a direction perpendicular to it, and the power-takeoff gear wheel may therefore be provided closer to the pinion and the motor. A hypoid stage may also provide similar aspects, but the pinion would have to be adjusted after assembly. However, due to the use of the spiroid gear unit, the central housing part may be formed and guided around the gear unit such that only a small gear housing cover may be necessary, and that nevertheless, the assembly may be carried out simply and rapidly.

LIST OF REFERENCE NUMERALS 1 bearing
2 shaft sealing ring
3 housing cover
4 cooling devices
5 shaft sealing ring
6 bearing
7 shaft sealing ring
8 output shaft
9 bearing
10 gear wheel
11 stator
12 permanent magnets
13 rotor shaft
14 pinion
15 shaft sealing ring
16 stator winding
17 electronics compartment
18 bearing
19 resolver stator
20 bearing
21 housing part
22 housing part
23 resolver rotor
31 electronics compartment
40 gear unit
51 electric motor
52 first toothed member of the first gear stage
53 motor housing wall
54 second toothed member of the first gear stage
55 first connected toothed member of the second gear stage
56 second toothed member of the second gear stage
57 hollow output shaft
58 toothed member
59 brake
60 housing
61 housing wall
71 central housing part
72 housing cover
73 housing cover
74 housing cover
75 spiroid pinion
76 spiroid gear wheel
77 gear wheel
78 gear wheel
79 braking resistor Example embodiments of the present invention are explained in greater detail below with reference to the appended Figures.

DETAILED DESCRIPTION

Figure 1:
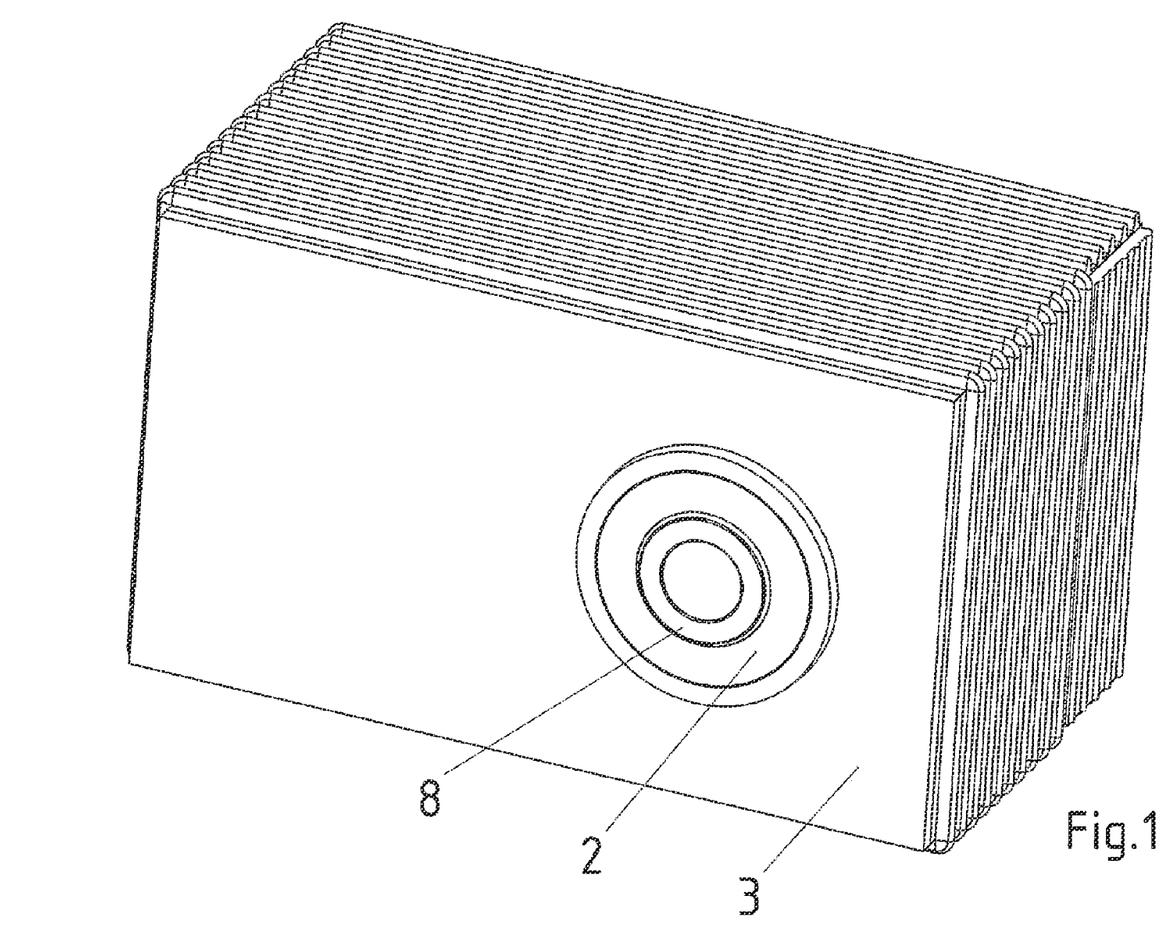
FIG. 1 is a perspective view of a compact drive according to an example embodiment of the present invention.
Figure 2:
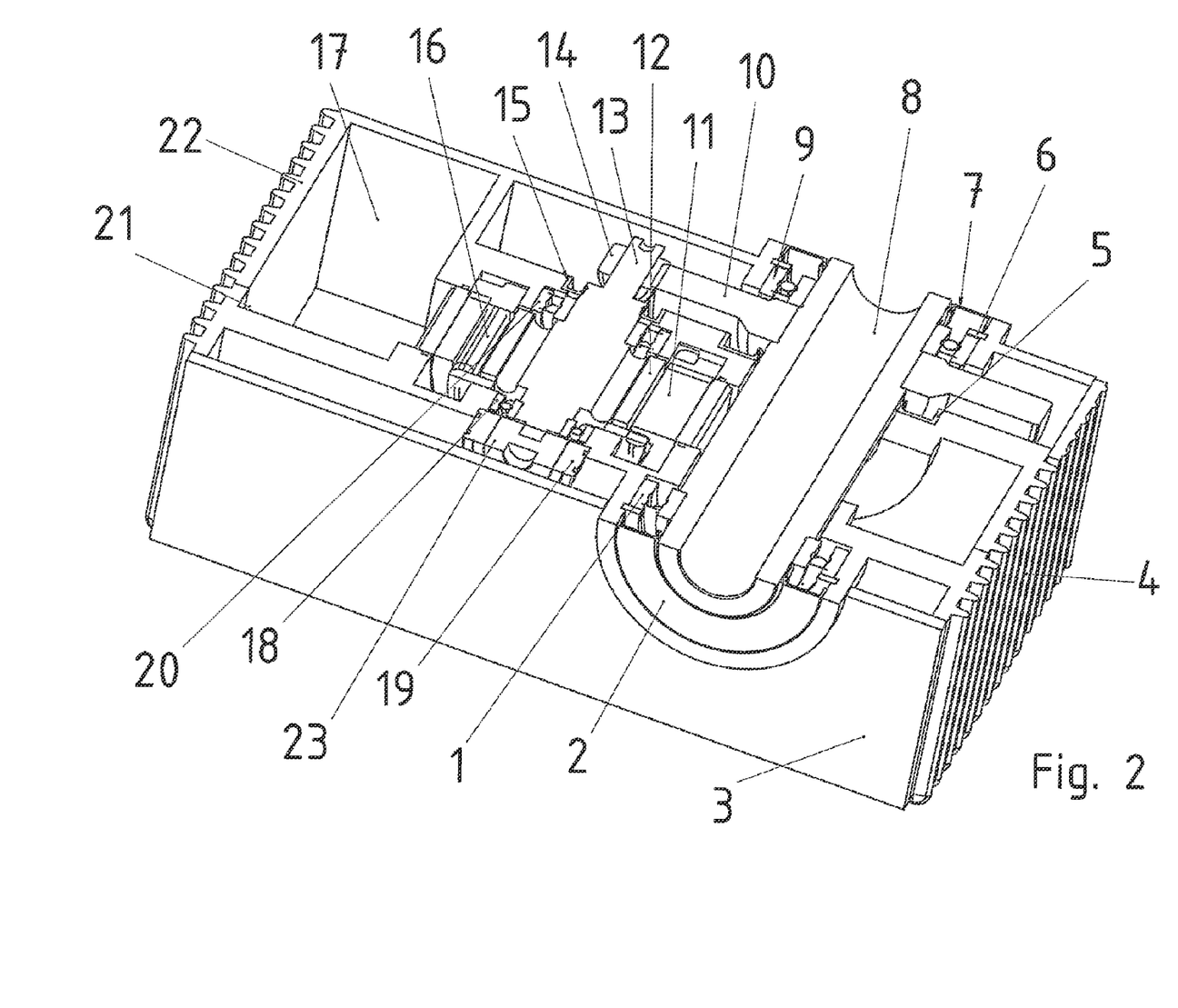
FIG. 2 is a partial cross-sectional view of a compact drive according to an example embodiment of the present invention.
Figure 3:
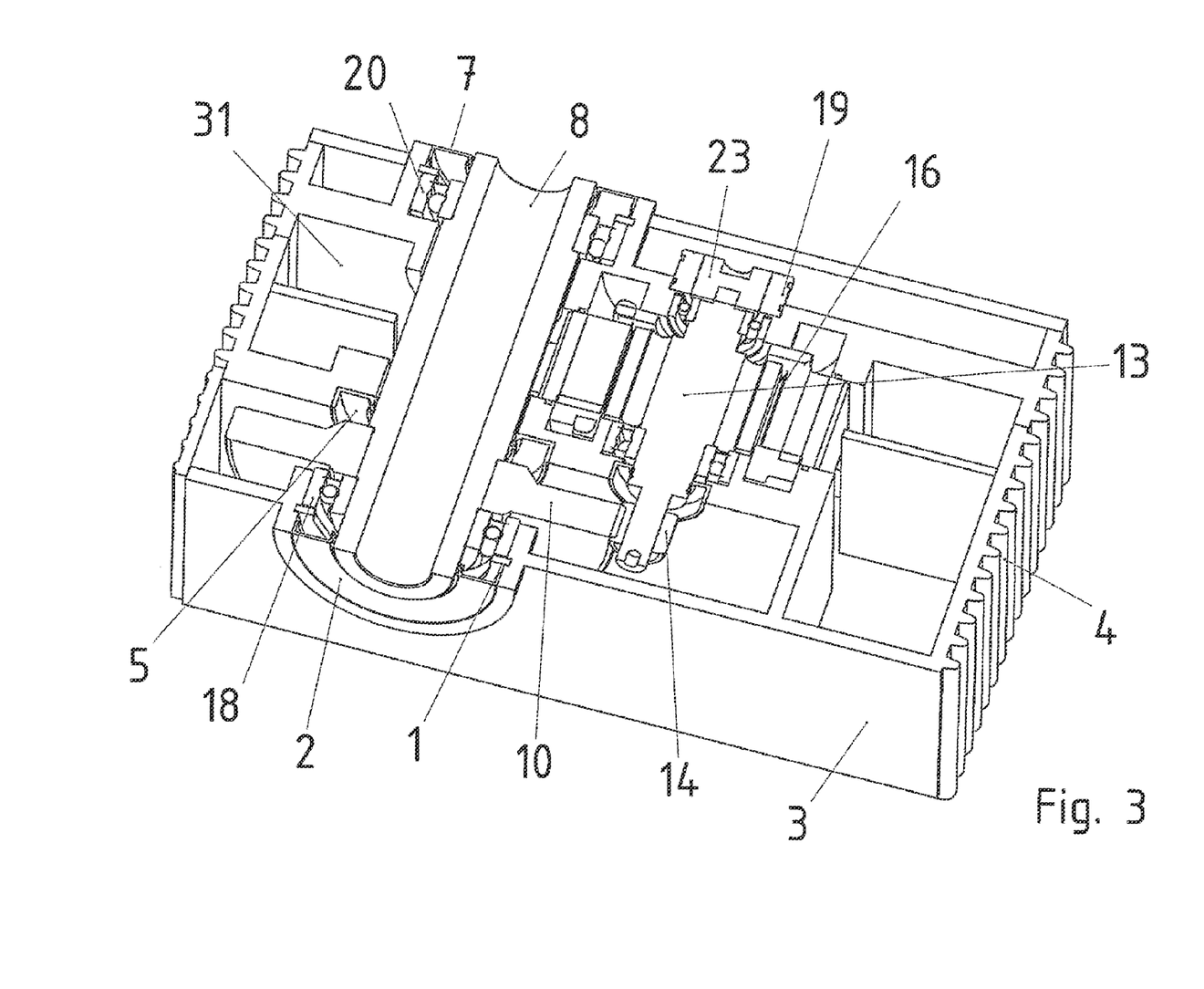
FIG. 3 is a partial cross-sectional view of a compact drive according to an example embodiment of the present invention, where, in contrast to FIG. 2, the frequency converter and the motor are arranged on different sides of the output shaft.
Figure 4:
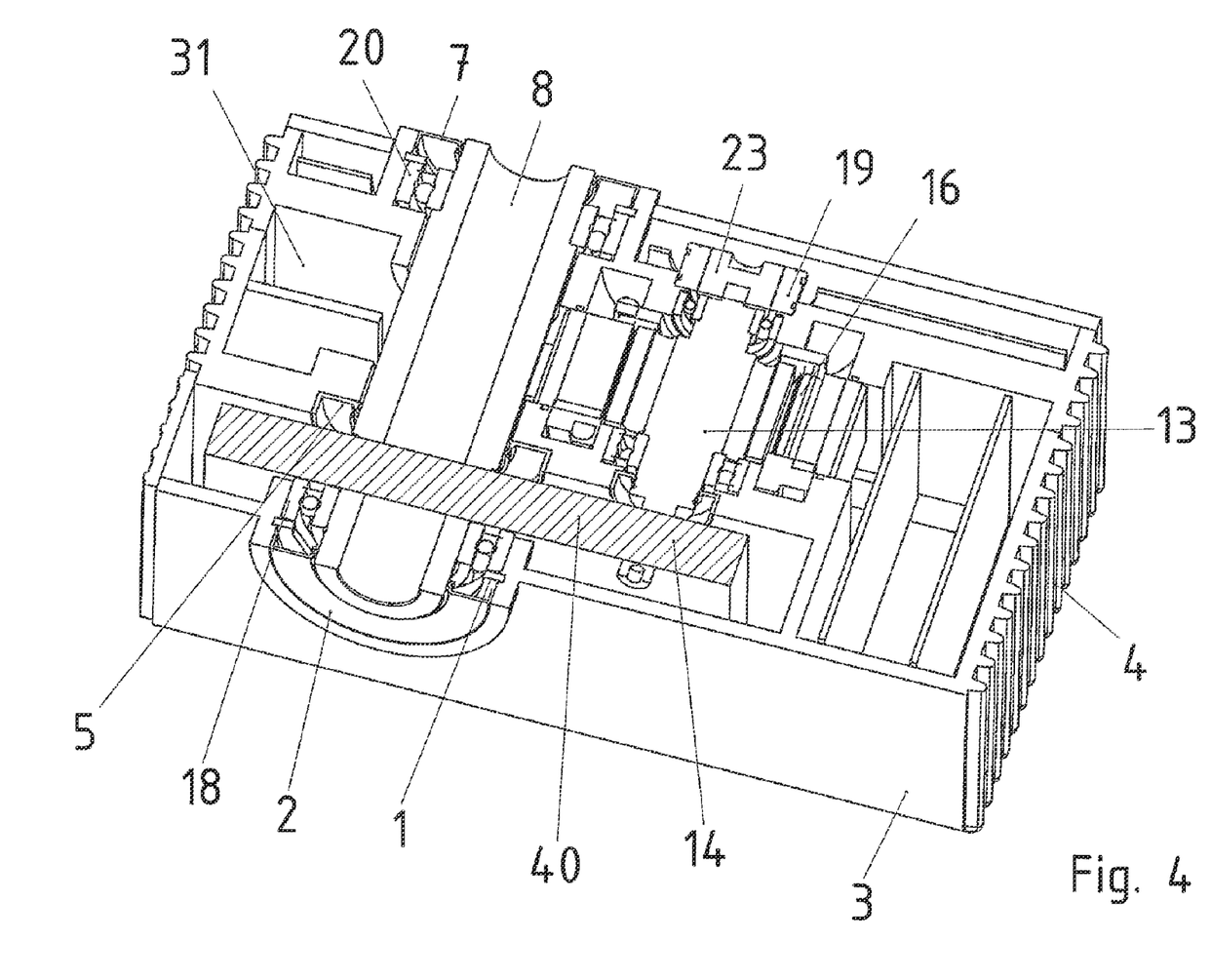
FIG. 4 illustrates an example embodiment of the present invention.

In each instance, the gear unit schematically illustrated in FIG. 4 is implemented differently in different example embodiment of the present invention. In an example embodiment, it is arranged to be a spur-gear unit, which is also illustrated in FIGS. 2 and 3. In an example embodiment, the gear unit illustrated in FIG. 4 is arranged to be a variable transmission. This variable transmission may be manufactured in the form of a VARIMOT transmission of the company SEW Eurodrive, e.g., so as to have two disks rubbing together, or in the form of a VARIBLOC transmission of the company SEW Eurodrive, e.g., as a continuously variable wide-belt transmission, the spacing of the two conical adjusting disks determining the transmission ratio. A chain may also be used in place of a v-belt.

In the exemplary embodiment illustrated in FIG. 2, the motor is positioned laterally with respect to the output shaft. Therefore, rotor shaft 13 and output shaft 8 are parallelly situated. The center-to-center distance of these shafts is determined by the engaging parts of the spur-gear stage, which includes a pinion 14 connected to rotor shaft 13 in a form-locked or friction-locked manner and a gear wheel 10, which is manufactured as a spur gear and is connected to output shaft 8.

The compartment of the gear unit, i.e., the spur-gear stage, is sealed with respect to the compartment of the electric motor. Shaft sealing ring 15 seals these compartments at the rotor shaft, since the rotor shaft carries permanent magnets 12 in the compartment of the motor, as well as pinion 14 in the compartment of the gear unit. Shaft sealing ring 5 seals the compartment of the gear unit with respect to the compartment of the motor at output shaft 8, which is manufactured as a hollow shaft.

A different gear unit including several gear stages may be used instead of the spur-gear stage illustrated.

The output shaft may not take the form of a hollow shaft, but rather a solid shaft. In addition, it is also possible to arranged the output shaft according to the standard for robot interfaces, which means that a highly compact power take-off having a short overall axial length is produced.

Output shaft 8 is supported by bearing 1 in the same housing part 21, in which rotor shaft 13 is also supported by bearing 18.

The compartment of the motor is sealed with respect to the environment, using the shaft sealing ring 2 that is on output shaft 8 and is inserted into housing cover 3.

Housing parts 21 and 22 are provided with cooling devices 4 for dissipating the heat generated in the motor, gear unit, and frequency converter.

Output shaft 8 is supported by the other axially opposite bearing (6, 9) in the same housing part 22, in which rotor shaft 13 is also supported by the other bearing 20.

No clutch is necessary between the motor and the gear unit, which consequently eliminates the need for additional parts. In particular, the motor and gear unit even use the same housing parts jointly. In addition, it is possible to already accurately align the shafts with respect to each other during the processing and machining of the housing part, in that the relative position of the bearing seats for the motor and the gear unit, e.g., of bearings 9 and 20, may be set in an extremely accurate manner during manufacturing, for the housing part may be finished in only one machine tool, in only one instance of chucking. Therefore, the relative position of the bearing seats may be adjusted very accurately with respect to each other. The common usage of a housing part may also be advantageous in that, in this manner, the compact drive not only requires a small volume, but also has a particularly high strength, since the forces of the motor and the gear unit are transmitted to each other inside the same housing part.

A further aspect of a jointly used, i.e., central housing part is also the rapid distribution of the heat supplied in one region to other regions. Therefore, no interfaces hinder the transport of heat in the direction of other regions. Since the different regions always produce different portions of the heat, the heat produced by the largest, corresponding source may be distributed more rapidly to the other regions via the central housing part. This distribution of the heat provides that a very large surface area is available for dissipating heat to the environment. Therefore, even special, complicated, and expensive cooling devices, such as cooling fingers and/or cooling fins, may be eliminated. In addition, the housing may be manufactured to be essentially smooth, which means that fluids may drain off rapidly and easily.

The compartment of the gear unit is sealed with respect to the environment, using the shaft sealing ring 7 that is on output shaft 8 and is inserted into housing cover 22.

Stator 11 having stator windings 16 is positioned around rotor shaft 13.

This electric motor is a multiphase synchronous motor. However, any other motor may be integrated into the compact drive in place of the synchronous motor.

Shaft sealing ring 15, which is on the rotor shaft and is inserted into housing part 22, seals the compartment of the gear unit with respect to the compartment of the motor.

Electronics compartment 17 for the frequency converter is not sealed with respect to the compartment of the motor.

On its one axial end, the motor supports a resolver, which includes a resolver stator 19 and a resolver rotor 23.

Other angular-position sensors or angular-velocity sensors may also be provided in place of the resolver. A brake may also be integrated into the compact drive on the side opposite to the angular-position sensor.

The frequency converter is operated such that with the aid of a method, the angular value is estimated using a suitable motor model. This allows the overall axial length to be further reduced.

An exemplary embodiment according to the present invention is illustrated in FIG. 2, where electronics compartment 31 is not directly to the compartment of the motor, but rather output shaft 8 is between them. In this example embodiment, shaft sealing ring 5 seals the compartment of the gear unit with respect to electronics compartment 31, shaft sealing ring 5 running on output shaft 8 and being seated in housing part 21.

The gear unit may be filled with lubricant, such as lubricating oil, lubricating grease, etc.

In the illustrated exemplary embodiments, no substantial thermal barrier is provided between the compartments of the frequency converter, i.e., the electronics compartment, and the gear-unit compartment and the motor compartment. Consequently, the compartments are at approximately the same temperature. Approximately the same temperature means, e.g., a maximum temperature difference of 10° C. during continuous operation at nominal load. A larger, short-term temperature difference of the compartments is attainable in the case of intermittent operation. No special thermal barrier is necessary, and that the amount of material, mass, and costs may therefore be reduced.

Thermal barriers may also be provided between two or more of the compartments.

The motor may be arranged to be multipolar, e.g., eight-poled or ten-poled. The motor may be arranged as described, for example, in German Published Patent Application No. 100 49 883 or German Published Patent Application No. 103 17 749. Therefore, a single gear stage, together with such a multiphase motor, is sufficient to cover a wide range of transmission ratios.

Not a hollow shaft, but rather a cylindrical shaft stub may take the form of an output shaft, this output shaft being connectable to the device to be driven, using a feather-key connection.

The output shaft and the output-side housing part may be manufactured in accordance with robot interface EN-ISO 9402-1. This allows the overall axial length to be reduced and a high torque to be transmitted. In addition, compatibility with corresponding devices to be driven and connected is achieved.

The electrical connection terminals are provided on the back of the housing. However, other positions for the connection terminals may also be provided.

The connection terminals may be arranged as a power supply. For example, only electric power cables are run to the compact drive. In this context, the transmission of data to the frequency converter or from the frequency converter to another, e.g., superordinate unit is accomplished by modulating them upon the power lines, the transmission of data being necessary for the data communication. The modulation may be accomplished in a conventional manner, e.g., as conventional from powerline communication or according to FSK or the FH/PSK method, i.e., Frequency Hopping Phase Shift Keying.

Figure 5:
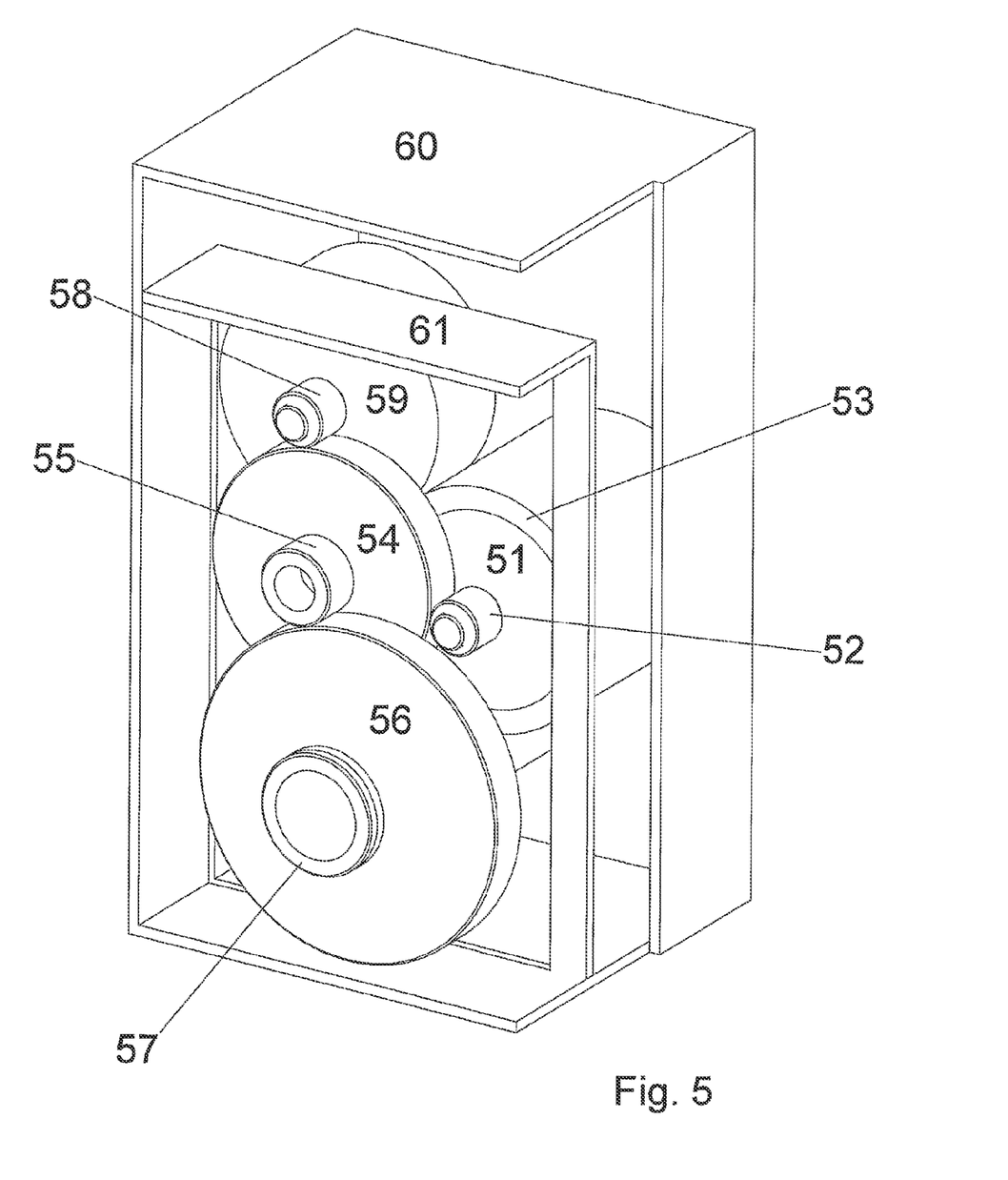
FIG. 5 illustrates an example embodiment of the present invention.

Illustrated in FIG. 5 is an exemplary embodiment of the present invention, in which housing 60 has a compartment for electric motor 51, the compartment being separated off by a housing wall 53. The electric motor has a pinion as a first toothed member 52 of the first gear stage, the pinion being connected to the rotor shaft of electric motor 51 in a form-locked or force-locked manner and engaging with a second toothed member 54 of the first gear stage, the second toothed member being connected on an intermediate shaft. This intermediate shaft is connected to a further toothed member, e.g., first toothed member 55 of the second gear stage, the first toothed member engaging with second toothed member 56 of the second gear stage. This toothed member 56 is connected to hollow output shaft 57, which allows a compact connection to a device to be driven. A brake 59 may include a brake rotor, which is connected to a pinion in the form of a toothed member 58, the pinion engaging with the second toothed member of the first gear stage. Thus, electric motor 51 is manufactured without a brake. Brake 59 carries out its braking action on a toothed member, via pinion 58. The braking action is carried out not directly, but rather indirectly.

As illustrated in FIG. 5, the gear region may be sealed with respect to the region of the electric motor and the brake. The regions of the brake and the motor do not have to be sealed with respect to each other. The regions are arranged in corresponding housing pockets, whose walls are the housing walls. The electronics region, i.e., the frequency-converter region, may also be sealed with respect to the other regions, e.g., with respect to the gear-unit compartment. No absolute sealing is necessary from the electronics region to the motor region. The cable bushings from the electronics region to the motor region, and in some instances to the gear region, are sealed and manufactured to provide a high degree of protection.

The gearing parameters in FIG. 5 may be selected so that the braking torque of the brake transmitted to the rotor shaft is less than, greater than, or equal to the rated motor torque. For example, in an arrangement in which the transmitted braking torque is greater than the rated motor torque, the brake may be manufactured to be very small and compact. This allows the overall volume to be reduced.

In FIGS. 1 to 5, it should be apparent that the housing of the compact drive may have the shape of a right parallelepiped. Since the axis of the hollow output shaft is oriented in the direction of the normal to the largest surface of the rectangular parallelepiped, the drive unit may be used in applications that are usually reserved for right-angle drives. The compactness of the drive unit may be produced by the configuration of the rotor axis, namely oriented in a direction parallel to the output shaft of the compact drive.

Instead of the block-shaped arrangement, a similar arrangement of the housing may be provided, although the rectangular parallelepiped has a sizable recess in the region of the output shaft. This does reduce the spacing of the output bearings and, therefore, the rigidity with respect to transverse forces, but there is sufficient space for connection to the shaft to be driven.

In addition, the compact drive may allow a higher efficiency to be attained than in the case of right-angle motors, since spur-gear units may be used. This is because these always have a higher efficiency than right-angle drives.

It may also be provided that the housing of the entire compact drive has a central housing part, which fills the housing function for the motor, gear unit, and electronics. Only housing covers are connected on the housing part. The central housing part includes bearings for the gear unit and for the motor. It is also in contact with gear lubricant on its inner side. In addition, the laminated core of the stator of the motor is supported in the central housing part. However, not only are the gear lubricant and the stator windings connected to the central housing part so as to effectively conduct heat, but also the electronics, including an optional braking resistor. However, in the part of the electronics that does not include the braking resistor, a housing cover is connected so as to conduct heat, in order to dissipate the heat of the electronics to the environment.

Since the central housing part is at least connected to all three drive components so as to effectively conduct heat, and therefore, each drive component may give off heat to the central part. Since the central part is very large, it has a high heat capacity and may therefore absorb short-term peaks of the heat flowing from the drive components to it. This may be particularly advantageous, since the different drive components have different heat losses at different operating states.

For example, the heat generation of the motor is very high when the drive unit is started from rest in the range of the breakaway torque. Stated in general terms, the heat generation of the motor is a function of the torque. However, the heat generation of the gear unit is a function of rotational speed, i.e., it is only relevant later, with increasing speed.

Therefore, an aspect of the common, central housing part is that a large mass is available and, therefore, effective heat equalization takes place between the drive components.

Because of the central housing part, interfaces between the drive components are eliminated, i.e., fewer components, such as housing parts, seals, screws, etc., are necessary, and the entire drive unit may be manufactured more compactly. Processing steps usually necessary for interfaces are eliminated.

Toothed members of gears of a gear-unit construction kit may be reused for gear stages of the compact drive. Therefore, the total number of toothed members to be manufactured is less.

A sensor may be mechanically connected to the output shaft and electrically connected to the electronics region. The sensor is an angular-position sensor and/or a torque sensor. Therefore, the control software in the frequency converter may be manufactured to have especially good control characteristics.

The compact drive may have, on the front side and on the back side, the same mechanical interface for connection to a device to be driven. To this end, the output shaft is manufactured as a hollow shaft that passes through from the front side to the back side. Therefore, the compact drive may be installed in a system or machine from both sides. In addition, it is also possible to connect compact drives in series, which means that the total torque may be increased.

The electric motor may be a synchronous motor. Therefore, the losses due to slip are reducible and the control accuracy is improvable.

The electric motor may be manufactured as a reluctance motor in a cost-effective manner.

Instead of the brake, a different energy-storage mechanism may be manufactured, i.e., a flywheel or another rotating mass, for example. To this end, the gear teeth of the brake pinion are designed together with the gear teeth engaging with them such that the flywheel rotates at a high speed, e.g., for saving space.

The pinion of the brake may engage with the first toothed member instead of the second toothed member and therefore performs the braking action directly.

A gear stage, e.g., the one furthest to the side of the power take-off, may take the form of a right-angle gear stage, e.g., a worm-gear stage or a spiroid gear stage. This may render particularly compact arrangements possible.

The electronics region may border on the gear region and may only be separated from it by a housing wall. Therefore, the heat generated by the electronics may be dissipated via the housing wall and the lubricant of the gear unit. The lubricant circulation, which is increased by the movement of the toothed members, is therefore an arrangement for dissipating the heat to the environment, for the heat is transported by the lubricant to the other housing walls of the gear region, and given off to the environment from there. Heat may be removed in the same manner, when the motor region borders on the gear region via a housing wall.

As illustrated in FIGS. 2 to 5, the region of the electronics is near the region of the motor. Therefore, a transmitter or a plurality of sensors may be provided in the electronics compartment, e.g., on a printed circuit board of the electronics themselves. Depending on the manner of attachment of the sensor to the printed circuit board, this sensor therefore detects values of state variables in the electronics or motor compartment. For this purpose, at least a subsection of the transition of the electronics region to the motor region is arranged to be open. Therefore, if the housing cover is mounted, along with the electronics, on the central housing part, then the sensor connected to the electronics is correctly positioned.

On one hand, temperature sensors and, on the other hand, angular-position sensors or angular-speed sensors may be provided as sensors. Hall sensors, which detect the magnetic field of the permanent magnets of the rotor, may be used, for example, as angular-position sensors. In this manner, the angular-position data and/or angular-speed data may be acquired directly at the rotor.

When a temperature sensor is used, it is possible to monitor the temperature. However, it is also possible to control the temperature by specifying the power supplied to the braking resistor and/or the power transmitted to the motor. Therefore, it is possible to even control the temperature.

To obtain a high torque, the stator windings are manufactured as tooth windings, i.e., windings are slid onto each tooth or wrapped around it to obtain, e.g., higher torques and higher efficiencies.

Additionally provided in the region of the electronics is a housing wall of the central housing part, the braking resistor being attachable to the housing wall such that it is connected to the housing wall and the gear lubricant located on the other side of this wall so as to be able to conduct heat highly effectively. A housing pocket may be formed for accommodating the braking resistor. The braking resistor allows the compact drive to be heated in a manner that surpasses the options for heating the stator windings with the aid of a superimposed d.c. component. Therefore, the compact drive may also be used at very low temperatures.

In addition, an electronic type label, i.e., a writable memory that stores data about the drive, as well as status data or maintenance and diagnostic information, is provided in the region of the electronics. The storing may also be carried out without an external power supply. For example, data that relate to temperature, rotational speed, and/or torque may be stored. In this context, the storing and/or summing of the time periods weighted with the respective temperature may be used for determining the lubricant-replacement interval.

The core assembly may include teeth, onto which the stator windings are slid, or around which the stator windings are wound. Therefore, high torques and a high motor efficiency may be attainable with low manufacturing costs.

Figure 6:
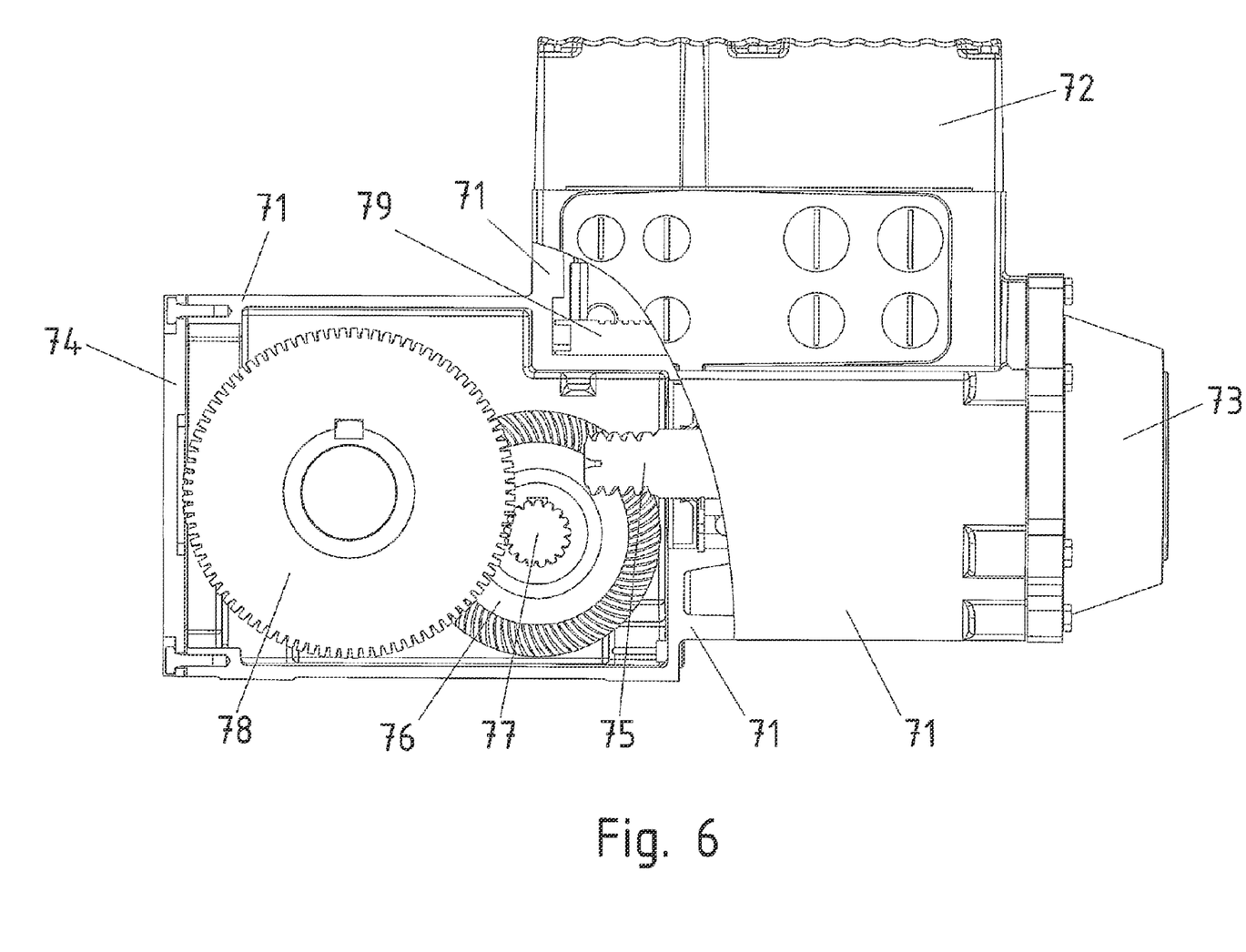
FIG. 6 illustrates an example embodiment of the present invention.

FIG. 6 illustrates an exemplary embodiment of the present invention, in which no brake is provided and the output shaft of the drive unit is perpendicular to the rotor shaft. This produces a compact right-angle drive. Central housing part 71 fulfills the function of forming the housing for the electronics region, the motor region, and the gear region.

Housing cover 72 includes a fixture for a printed circuit board, which is connectable to a further printed circuit board with the aid of a plug-and-socket connector, the further printed circuit board being accommodated and connected in central housing part 71.

Housing cover 73 is removable, which means that the motor, including the stator core assembly, stator windings, and also the rotor shaft, may be installed in central housing part 71.

Housing cover 74 is removable as well, which allows the gear unit to be installed and/or lubricant to be poured in.

The gear unit has two stages, the input stage being a spiroid-gear stage, and the output stage being a spur-gear stage. Spiroid pinion 75 connected to the rotor shaft of the motor has a cylindrical contour and is axially offset from the axis of the spiroid gear wheel 76 engaging with pinion 75. The output stage is formed by gear wheels 77 and 78.

A compact drive unit, e.g., a frequency-converter gear motor, may be implemented by the example embodiment shown.

The axial offset of the spiroid input stage allows a lesser straddling height to be maintained. This means, for example, that the output shaft may drive a wheel, which supports and drives a belt that runs under the compact drive and is not disturbed by the motor housing, for the axial offset allows the motor to be positioned higher than the bottom edge of the gear unit. In this context, the electronics region is "at the top" and the bottom edge of the gear unit is "at the bottom" in FIG. 6.

If a bevel-gear unit is used as an input stage, then only a motor having a lower output and, therefore, smaller construction type may be usable. However, a high-torque motor may be used, since the axial offset provides room without reducing the straddling height.

The optimization of the straddling height allows the distance from wheels 78 and 76 to the bottom edge of the gear unit to be at as short as possible.

In the motor region, the central housing part is higher than the lower side of the gear unit, i.e., the bottom edge of the gear unit, the bottom edge of the gear unit being provided on the side facing away from the electronics region.

In the spiroid gear stage, the pinion axis does not intersect the wheel axis and is oriented perpendicularly to it, the axial offset being less than the pitch-circle radius of the gear teeth of the wheel. This allows high efficiencies to be attained, even though an axial offset is provided. The contour of the pinion is a cylinder, i.e., not a cone. This is in contrast to bevel-gear stages.

Braking resistor 79 is arranged in a recess of central housing part 71, the recess extending into the gear region. Therefore, the heat passing through the housing wall of the housing part may be distributed rapidly and easily by the lubricant, which means that the heat may be distributed rapidly via the central housing part. In the vicinity of the input side, i.e., closer to the input side than the output side, the housing pocket extends into the gear region, for the movement of the toothed members, and therefore the speeds of motion of the lubricant as well, are more rapid here, which results in rapid dissipation of the heat of the braking resistor.

A position sensor may be integrated in housing cover 73. However, a sensor may be eliminated and replaced by a sensorless, open-loop and closed-loop control method in the frequency converter, the control method being suitably implemented for, e.g., synchronous motors. In this manner, housing cover 73 may be manufactured to be smaller.

What is claimed is:

1. A compact drive, comprising:
    an electric motor;
    a gear unit; and
    a frequency converter, an output shaft of the gear unit and a rotor shaft positioned in parallel to each other, and a shaft-center distance determined by at least one gear stage; a first gear stage including a first toothed member connected to the rotor shaft and a second toothed member, which engages with the first toothed member and is connected to an intermediate shaft; and an electronics compartment for the frequency converter not being sealed with respect to a compartment of the electric motor.

* * * * *